United States Patent [19]

Schroeder et al.

[11] Patent Number: 4,924,696

[45] Date of Patent: May 15, 1990

[54] NONCONTACTING POSITION SENSOR FOR AN AUTOMOTIVE STEERING SYSTEM

[75] Inventors: Allen G. Schroeder, Livonia; Thaddeus Schroeder, Rochester Hills; Sam M. Karadsheh, Troy; Janet S. Goings, Milford; Ronald T. Golebiewski, Romeo, all of Mich.

[73] Assignee: General Motors Corporation, Detroit, Mich.

[21] Appl. No.: 384,375

[22] Filed: Jul. 24, 1989

[51] Int. Cl.⁵ .......................................... G01M 19/00
[52] U.S. Cl. .................................. 73/118.1; 180/148
[58] Field of Search ............... 73/118.1; 180/148, 132, 180/161, 162

[56] References Cited

U.S. PATENT DOCUMENTS 4,785,901 11/1988 Maeda ............................. 180/148 X
4,793,433 12/1988 Emori et al. ..................... 180/148 X

OTHER PUBLICATIONS

Article entitled Magnetic-Field-Sensitive Semiconductor Position Sensors-Practical Application Circuits, pp. 7-10.
Brochure entitled Wearfree Control with Magnetoresistor Potentiometers from Siemens, pp. 1-6.
Article entitled Technical Data, published by Siemens Aktiengesellschaft, SB 018012.
Paper designated FP 412 L 160, The Differential Magneto Resistor.
Paper designated FP 414 L 300, Differential Magneto Resistor, pp. 1-2.
Copy of pages 45-46 from publication entitled Felplatten.

*Primary Examiner*—Jerry W. Myracle
*Attorney, Agent, or Firm*—Mark A. Navarre

[57] ABSTRACT

A noncontacting automotive steering angle sensor involving the application of a two element magnetoresistive sensor to an otherwise conventional rack and pinion steering system. The rack is directly coupled to the steerable wheels, and the sensor is integrally mounted in a spring-loaded rack contacting mechanism (contact shoe) used to maintain a meshing engagement between the pinion and the rack. A variable permeability surface is formed on the surface of the rack along the travel path of the sensor such that axial movement of the rack differentially varies the magnetic flux density detected by each element of the sensor. A detector circuit comprising a bridge or simple voltage divider responsive to the differential resistances of the sensor elements develops an electrical signal indicative of the rack position.

6 Claims, 5 Drawing Sheets 4,924,696

NONCONTACTING POSITION SENSOR FOR AN AUTOMOTIVE STEERING SYSTEM

This invention pertains to rack driven automotive steering systems, and more particularly to a noncontacting sensor apparatus for detecting the axial position of the rack.

BACKGROUND OF THE INVENTION

The steering angle of an automobile is often used as an input parameter for sophisticated vehicle control systems such as four-wheel steering, active suspension, anti-lock braking and traction control. When an electrical signal is required, rotary potentiometer devices are typically employed to sense the handwheel or pinion position. This approach is straightforward but involves the usual drawbacks associated with contacting sensors and fails to account for any discrepancies (due to compliance and hysteresis, for example) between the position of the handwheel or pinion and the actual steering angle.

SUMMARY OF THE PRESENT INVENTION

The present invention is directed to an improved noncontacting automotive steering angle sensor involving a novel application of a two element magnetoresistive sensor to an otherwise conventional rack and pinion steering system. The rack is directly coupled to the steerable wheels, and the sensor is integrally mounted in a spring-loaded rack contacting mechanism (contact shoe) used to maintain a meshing engagement between the pinion and the rack. The two elements of the sensor are positioned on axis transverse to axis of rack displacement, and a surface feature is formed on the rack along a axis diagonal to the axis of rack displacement such that axial movement of the rack differentially varies the magnetic coupling between the rack and the sensor. This produces a differential change in the electrical resistances of the magnetoresistive elements, and a detector circuit comprising a bridge or simple voltage divider responsive to the differential resistances of the sensor elements develops an electrical signal indicative of the rack position.

In the illustrated embodiment, the diagonal surface feature is defined by a rack mounted slide bar having a diagonally extending groove formed therein. The slide bar is received within a channel formed in the rack contacting mechanism so that the surface feature defined by the slide bar remains properly oriented with respect to the sensor, even though the rack experiences other than axial displacement. In this form, the modifications to a conventional rack and pinion gear are relatively minimal, and the output signal is substantially insensitive to mechanical nonlinearities of the system.

DETAILED DESCRIPTION OF THE DRAWINGS

Figure 1:
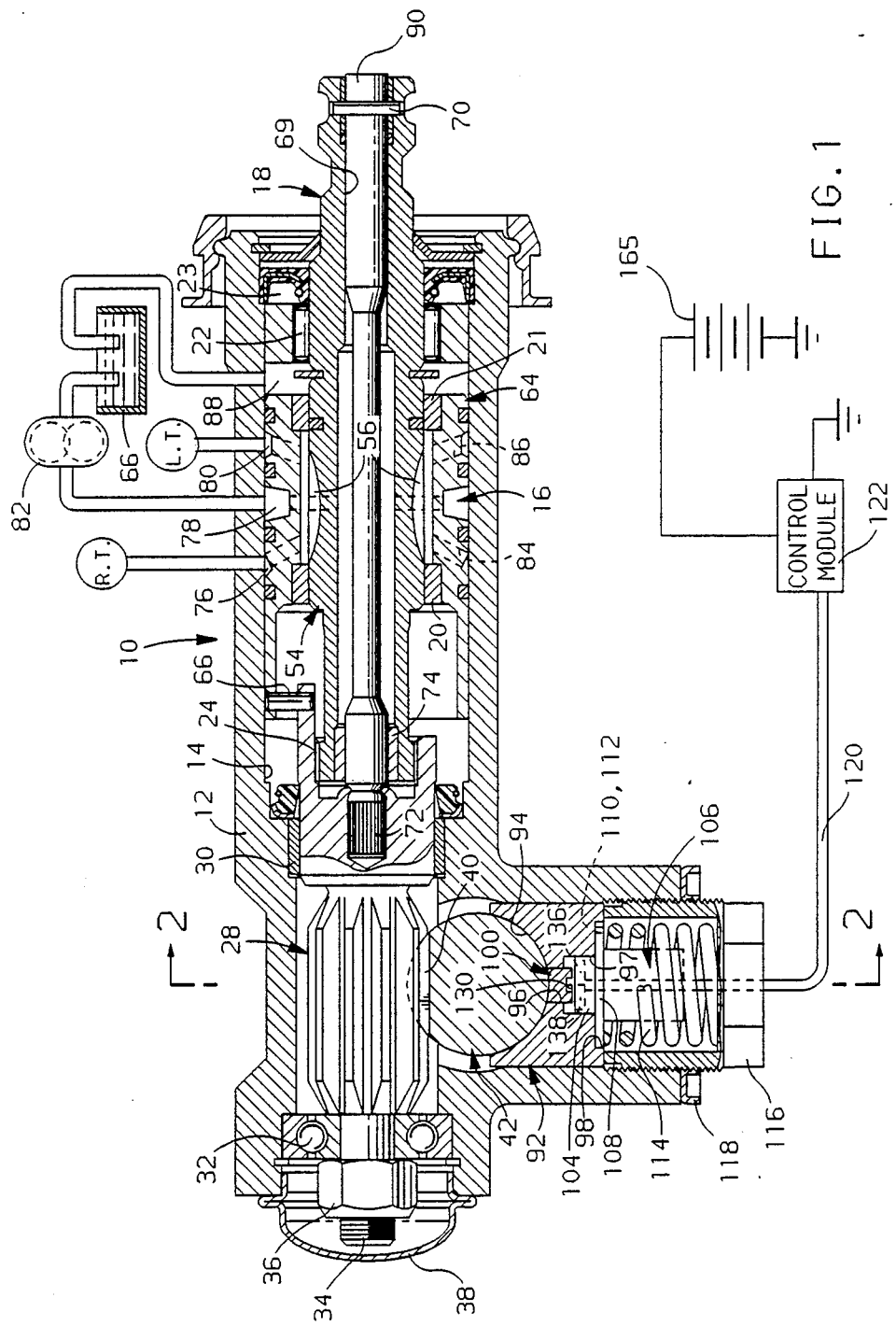
FIG. 1 is a cross section of a rack and pinion steering gear including a sensor assembly and electronic control module in accordance with this invention.
Figure 2:
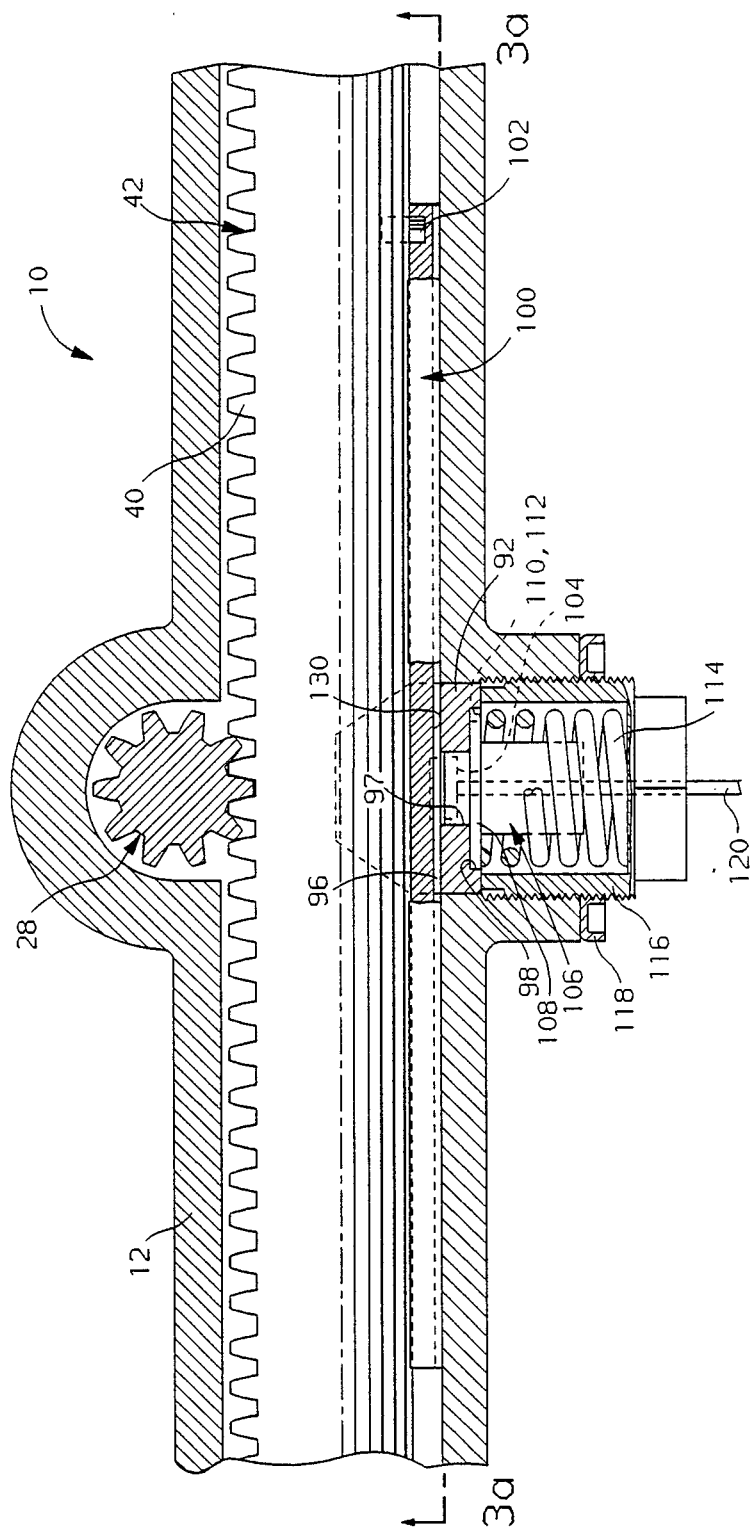
FIG. 2 is a section of the rack and pinion steering gear of FIG. 1 taken along lines 2—2.

Referring to FIGS. 1-2, the reference numeral 10 generally designates a portion of a motor vehicle hydraulic power assist rack and pinion steering gear. The steering gear 10 is disposed within a housing 12 having a smooth wall bore 14. A cylindrical rotary power steering gear valve assembly 16, disposed within the bore 14, includes an elongated cylindrical spool shaft 18 and valve body 64 supported for independent turning movement therein.

The inboard end of spool shaft 18 is supported on the roller bearing 22 and projects through an annular fluid seal 23 for connection to a conventional steering shaft and operator manipulated handwheel, not shown. THe outboard end of the spool shaft 18 is splined, as indicated by the reference numeral 24, with an elongated pinion gear 28 to define a lost motion mechanical coupling therebetween. The pinion gear 28 is rotatably mounted in the housing 12 by the sleeve bearing 30 and a ball bearing assembly 32 which receives a shank portion 34 of pinion gear 28. A nut 36 threaded onto the outboard end of the shank portion 34 secures the pinion gear 28 with the housing 12. A cup-like cover 38 frictionally fits into the end of the housing 12 to provide service access.

The teeth of pinion gear 28 mesh with the toothed portion 40 of an elongated rack 42 mounted for linear sliding movement within the housing 12. The rack 42 is operatively connected to the steerable wheels of the vehicle by suitable ball joints and tie rods, not shown. In such an arrangement, axial displacement of the rack turns the steerable wheels for vehicle steering purposes.

The rack 42 is also coupled to a fluid operated power cylinder mechanism or actuator, not shown, for applying a steering assist force to rack 42. As described below, the power steering valve assembly 16 is adapted to direct hydraulic fluid to right or left turn chambers (RT, LT) of the power cylinder to apply right-hand or left-hand steering assist force to rack 42. A power cylinder meeting the above description is described in detail in U.S. Pat. No. 4,454,801 to Spann, issued June 19, 1984, and assigned to the assignee of the present invention.

The spool shaft 18 of the power steering valve assembly 16 has a cylindrical valve spool 54 formed thereon. The spool 54 has a plurality of arcuate, axially extending oil transfer slots 56 formed in the periphery thereof. The valve body 64 is rotatably mounted on the valve spool 54 via sleeve bearings 20 and 21. The outboard end of the valve body 64 extends over the end of the pinion 28 and is drivingly connected thereto by radial pin 66.

The valve body 64 defines right turn supply and left turn chambers 76, 78, 80 between it and the valve bore 14. A hydraulic pump 82 supplies fluid to the supply chamber 78, and such fluid is directed to the right turn and left turn chambers 76, 80 via the slots 56 of valve spool 54 and the drilled passages 84 and 86, depending on the direction and degree of relative rotation between spool 54 and valve body 64. The right turn and left turn chambers 76, 80 are connected to the right (RT) and left (LT) chambers of the power cylinder (actuator), as indicated for generating a corresponding level of steering assist force in rack 42 as described above. An exhaust passage chamber 88 returns hydraulic fluid to the fluid reservoir 66 of pump 82. A detailed description of the valve 16 and the hydraulic system thereof is set forth in the above-referenced U.S. Pat. No. 4,454,801.

A resilient centering coupling between the valve spool 54 and valve body 64 is provided by the torsion bar 90, which permits the valve spool 54 to be rotated relative to the valve body 64 in relation to the operator exerted steering torque so that the valve 16 directs fluid to the power cylinder (not shown) for producing the desired level of steering assist force. On termination of the operator exerted steering torque, the torsion bar 90 centers the valve body 64 and spool 54 to terminate steering assist force.

The torsion bar 90 extends concentrically through an axial opening 69 in the spool shaft 18. A cross pin 70 connects the input end of torsion bar 90 to spool shaft 18. The output end of torsion bar 90 is splined and staked at 72 to the pinion 28. Bearing sleeve 74 supports the inner end of the spool shaft 18 on a cylindrical portion of the torsion bar 90.

Close meshing engagement between the teeth of the pinion 28 and the rack 42 is achieved by a rack contact shoe 92 having a machined arcuate surface 94 which is resiliently urged into contact with the rack 42 opposite the pinion gear 28. The contact shoe 92 includes a slot 96 and two concentric openings 97 and 98 radially aligned with the center of the rack 42. A slide bar 100 axially secured to the rack 42 by the pin 102 is received within the contact shoe slot 96; the tip 104 of a magnetoresistive sensor housing 106 is received within the opening 97; and a flange 108 of the sensor housing 106 is received within the opening 98. The openings 96-98 are axially offset such that the tip 104 of sensor housing 106 is slightly displaced from the outboard surface of slide bar 100. A locating pin 110 on the outboard end of the contact shoe 92 mates with a corresponding opening 112 in the flange 108 to angularly orient the sensor housing 106 with respect to the slide bar 100.

A helical spring 114 is seated between the flange 108 and an adjusting plug 116 to seat the sensor housing 106 against contact shoe 92 and to tension the contact shoe 92 against rack 42. Plug 116 is threaded into the steering gear housing 12 and can be axially adjusted therein to vary the spring force. An adjuster plug nut 118 maintains the plug 116 in a selected position, and a sensor lead-in cable 120 passes through suitable openings in the sensor housing 106 and plug 116 for connection to the control module 122.

As seen most clearly in reference to FIGS. 1 and 3a-3d, the ferromagnetic slide bar 100 has an end-to-end groove 130 extending diagonally across the width of the bar, defining a pair of tapered ridges 132, 134. As described below in reference to FIG. 6, the magnetoresistive sensor of FIGS. 1-2 houses a pair of juxtaposed magnetoresistor elements 136, 138 which correspond in overall width to the slide bar 100. When assembled, as described above in reference to FIGS. 1-2, the magnetoresistor elements 136, 138 are oriented with respect to the tapered ridges 132, 134 substantially as shown in FIGS. 3a-3d. Thus, the element 136 is positioned directly over and magnetically interacts with the tapered ridge 132 and the element 138 is positioned directly over and magneticlly interacts with the tapered ridge 134.

Figure 3A:
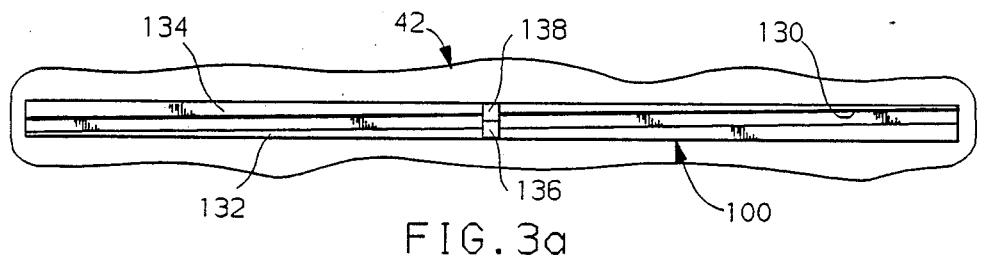
FIGS. 3a–3d are schematic representations of the sensor and slide bar of FIG. 1 for various axial positions of the steering rack.
Figure 3B:
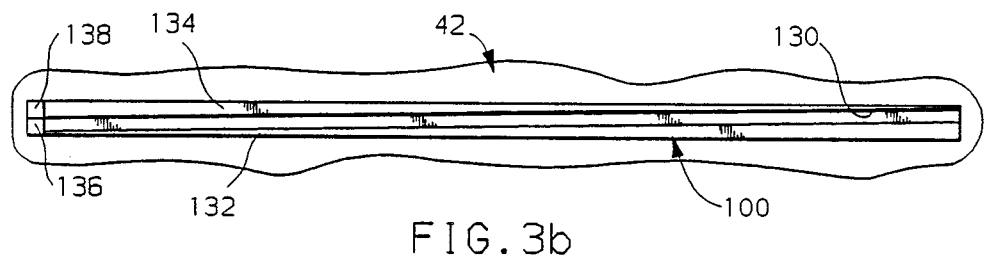
Figure 3C:
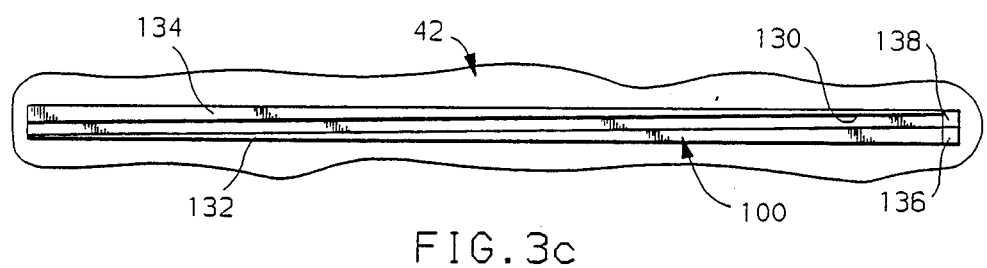
Figure 3D:
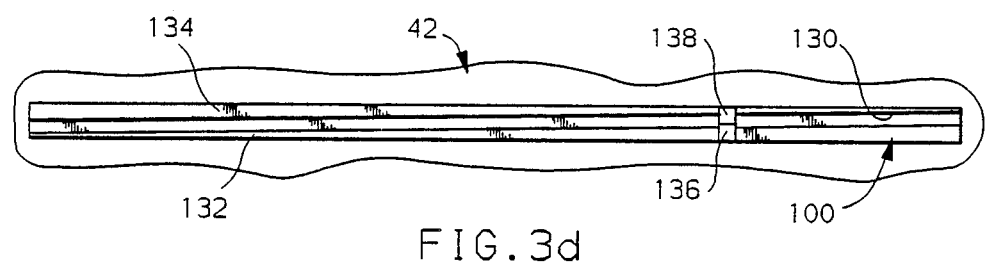

FIGS. 3a-3d depict the slide bar 100 and magnetoresistor elements 136, 138 for four different positions of the steering rack 42. For ease of illustration, the elements 136, 138 are depicted as moving with respect to the rack 42. In FIG. 3a, the rack 42 is centered for straight ahead vehicle operation, and the active ridge area seen by element 136, is substantially equal to that seen by the element 138. In this case, the flux densities of the elements 136 and 138, and therefore their characteristic resistances, are substantially equal. In FIGS. 3b and 3c, the rack 42 is fully displaced to the right and left, respectively, maximizing the active ridge area seen by one element 136, 138 while minimizing the active ridge area seen by the other element 138, 1136. In this case, the flux density around one element greatly exceeds that around the other element, resulting in a relatively large difference in the element resistances. In FIG. 3d, the rack 42 is partially displaced to the left so that the active ridge area seen by element 136 is somewhat greater than that seen by the element 138, giving rise to an intermediate difference in the element resistances. In any case, the resistance differential as between the elements 136 and 138 is detected by the control module 122 of FIG. 5, described below to provide a measure of the rack position.

Figure 6:
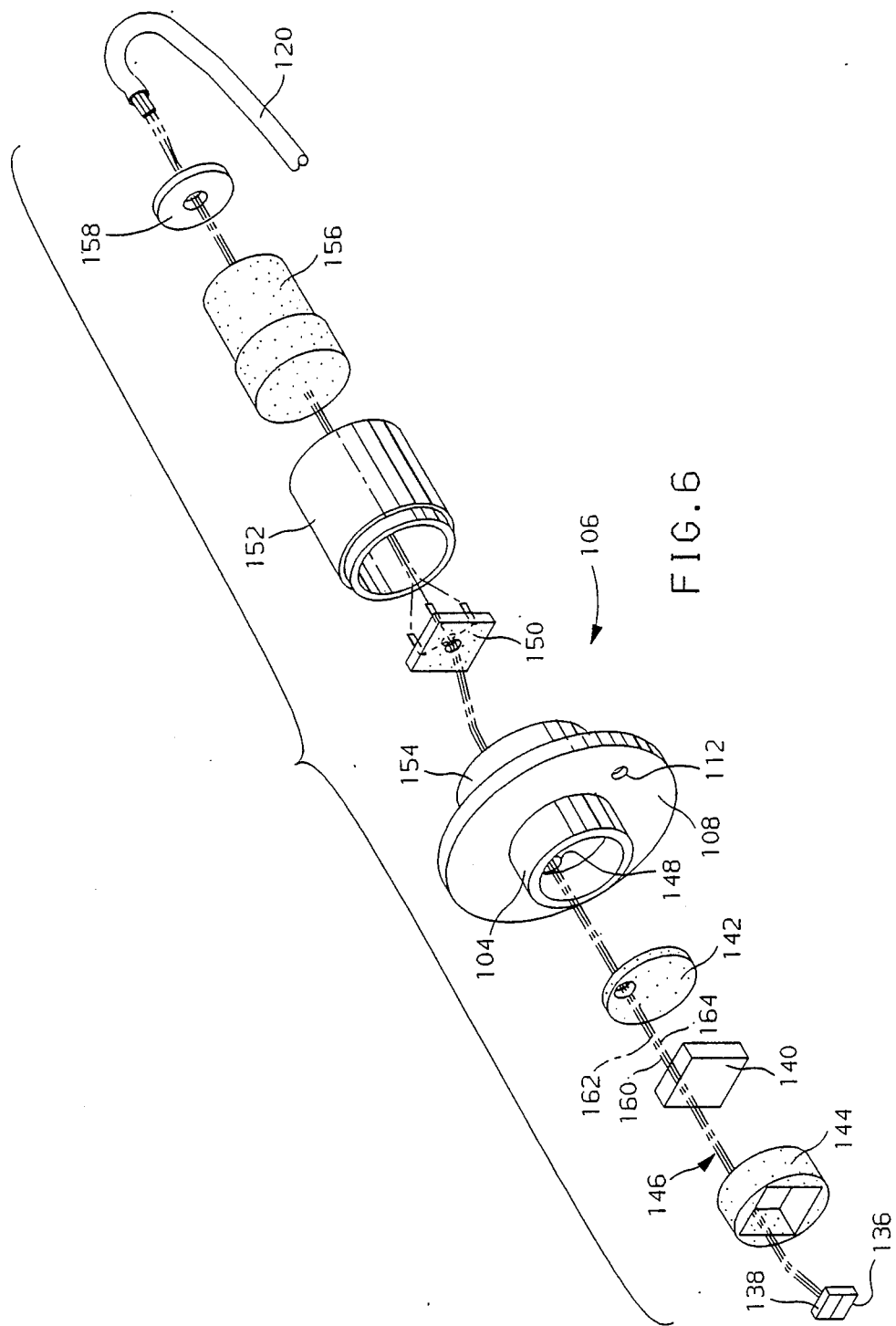
FIG. 6 is an exploded view of the sensor assembly of FIG. 1.

FIG. 6 is an exploded view of the magnetoresistive sensor depicted in FIGS. 1-2. The magnetoresistor elements 136, 138 (available from Siemens in a two-pack assembly as shown) are mounted on a permanent magnet 140 and mica insulator 142. The assembly is then potted inside the tip 104 of the sensor housing 106, as indicated by the potting material block 144. The bundle 146 of three lead-in wires 160, 162, 164 passes through the potting material and an opening 148 in the housing 106 for attachment to the external lead-in cable 120 via circuit board 150. The housing section 152 is press fit into a stem 154 of housing 106, and the circuit board 150 is potted therein as indicated by the potting material block 156. The retaining ring 158 is secured to the housing section 152, completing the sensor assembly.

When assembled in relation to the steering gear 10, as shown in FIGS. 1-2, the magnetoresistive elements 136, 138 are separated from the slide bar 100 by a slight air gap, and the permanent magnet 140 establishes a pair of magnetic flux paths through the elements 136, 138. The flux passing through element 136 passes through the tapered ridge 132 and the housing tip 104; the flux passing through element 138 passes through the tapered ridge 134 and the housing tip 104. In each case, the effective area of the ridge 132, 143 determines the flux density, and therefore, the electrical resistance of the elements 136, 138.

Figure 4:
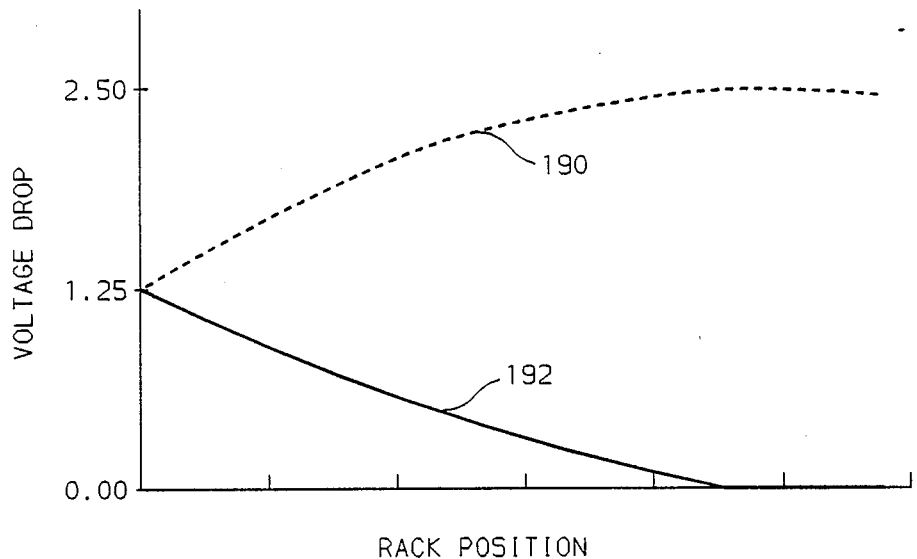
FIG. 4 is a graph depicting the output voltage of the control module of FIG. 1 as a function of rack position.
Figure 5:
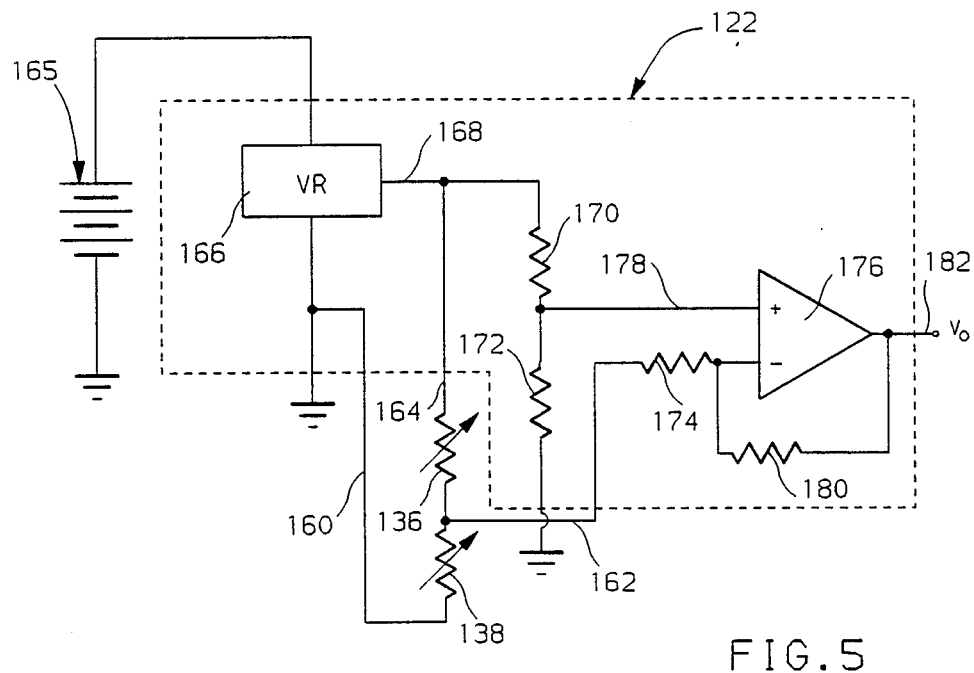
FIG. 5 is a circuit diagram of the control module of FIG. 1.

FIGS. 4 and 5 refer to the operation of the control module 122. FIG. 5 depicts the control module circuit and FIG. 4 depicts the circuit output voltage $V_o$ as a function of rack position.

Referring to FIG. 5, the magnetoresistor elements 136 and 138 are illustrated as a serially connected variable resistor divider. The lead-in cable of FIGS. 1-2 comprises the lines 160, 162 and 164, the line 162 being common to both elements. Also, as seen in FIG. 1, the control module 122 is supplied with power and ground connections to a storage battery 165. The reference numeral 166 designates a voltage regulator (VR) for supplying a regulated voltage via line 168 to the magnetoresistor divider, and to a separate resistor divider comprising the resistors 170, 172. The junction between magnetoresistors 136 and 138 is connected via resistor 174 to the inverting input of operational amplifier 176, and the junction between resistors 170 and 172 is connected via line 178 to the noninverting input of operational amplifier 176. The feedback resistor 180 determines the amplifier gain, and the output voltage $V_o$ of the circuit appears on line 182.

Those skilled in the art will understand that the circuit of FIG. 5 will provide an analog output voltage $V_o$ which has an offset determined by the ratio of divider resistors 170, 172. Together the resistor dividers define a bridge circuit, and the output voltage of the operational amplifier varies in relation to the differential resistance of the magnetoresistors 136 and 138. In the illustrated embodiment, the regulated voltage is approximately 2.50 volts, and the circuit elements are chosen to provide an offset voltage of approximately 1.25 volts, as seen in FIG. 4. For right-hand displacement of the rack 42, the output voltage varies over the approximate range of 1.25 volts to 2.50 volts, as indicated by the broken trace 190. For left-hand displacement of the rack 42, the output voltage varies over the approximate range of 0.00 volts 1.25 volts as indicated by the solid trace 192.

In the above manner, the sensor arrangement of this invention provides a simple, reliable and accurate indication of the steering rack position without any of the disadvantages of contacting sensor arrangements. The arrangement is inexpensive to produce and requires only minimal modification of a conventional rack and pinion steering system.

While this invention has been described in reference to the illustrated embodiment, it is anticipated that various modifications will occur to those skilled in the art. For example, the function of slide bar 100 could be achieved by forming a diagonal groove in the rack itself and limiting the rotary displacement of the rack. Similarly, the shape of the groove itself could be modified to produce an output voltage characteristic different from that shown in FIG. 4. In this regard, it should be understood that sensor arrangements incorporating these or other modifications may fall within the scope of the present invention, and that the scope of this invention is defined solely by the appended claims.

The embodiments of the invention in which an exclusive property or privilege is claimed are defined as follows:

1. In a motor vehicle steering system in which steering is achieved via linear displacement of a rack mechanism with respect to a housing member along a longitudinal axis, apparatus for detecting the position of the rack mechanism as a measure of the steering angle, comprising:

sensor means including first and second magnetoresistor elements secured to said housing member in proximity the rack mechanism on an axis transverse to said longitudinal axis;

means defining a surface feature on the rack mechanism adjacent said magnetoresistor elements and on an axis diagonal to said longitudinal axis for the rack mechanism and the sensor means in relation to the displacement of said rack mechanism; and means for developing an indication of rack position in relation to the consequent differential resistances of said magnetoresistor elements.

2. The apparatus set forth in claim 1, wherein the surface feature is defined by a ferromagnetic bar member secured to the periphery of said rack mechanism along the longitudinal axis thereof, the bar member having a channel formed therein substantially along said diagonal axis to define first and second tapered ferromagnetic surfaces magnetically coupled to said sensor means through said first and second magnetoresistor elements.

3. The apparatus set forth in claim 2, wherein:

the sensor means includes a first and second juztaposed magneteoresistive elements mounted on a permanent magnet within a ferromagnetic sensor housing member so that magnetic flux entering said first and second tapered surfaces from said permanent magnet is returned to said permanent magnet through said sensor housing member.

4. The apparatus set forth in claim 1, wherein:

the steering system includes a pinion gear drivingly engaged with said rack mechanism, and a contact member secured to said housing member opposite said pinion gear and resiliently contacting said rack mechanism for maintaining the engagement between said pinion gear and rack mechansim; and the means for defining a surface feature is defined by a ferromagnetic bar member secured to said rack mechanism for linear displacement therewith said received within a channel formed in a rack contacting surface of said contact member; and the sensor means is mounted in a central cavity of said contact member so as to position said magnetoresistor elements in proximity to the surface feature of said bar member.

5. The apparatus set forth in claim 4, wherein:

the surface feature of said bar member is defined by a channel formed across its width to define first and second variable ferromagnetic surfaces on either side of said channel which magnetically interact with said sensor means through said first and second magnetoresistor elements, respectively.

6. In a motor vehicle steering system including a rack member linearly displaceable within a housing member along a longitudinal axis to effect vehicle steering, a pinion gear drivingly engaged with said rack mechanism to control its displacement, and a contact member secured to said housing member opposite said pinion gear and resiliently contacting said rack mechanism for maintaining the engagement between said pinion gear and rack mechanism, apparatus for detecting the position of the rack mechanism as a measure of the steering angle, comprising:

sensor means including first and second magnetoresistor elements mounted in a central cavity of said contact member, the magnetoresistor elements being disposed in proximity to the rack mechanism on an axis transverse to said longitudinal axis;

means including a ferromagnetic bar member secured to said rack mechanism for linear displacement therewith and received within a channel formed in said contact member between said rack mechanism and said magnetoresistor elements, the bar member having a groove formed therein substantially along an axis diagonal to said longitudinal axis to define first and second differential are ferromagnetic surfaces magnetically coupled to said sensor means through said first and second magnetoresistor elements; and means for developing an indication of rack position in relation to the consequent differential resistances of said magnetoresistor elements.

* * * * *